United States Patent
Muneyoshi et al.

(10) Patent No.: US 9,250,437 B2
(45) Date of Patent: Feb. 2, 2016

(54) DISPLAY DEVICE

(75) Inventors: Takahiko Muneyoshi, Chiba (JP); Naohisa Ando, Mobara (JP); Takahide Kuranaga, Mobara (JP); Mitsuhide Miyamoto, Chiba (JP); Kazufumi Watabe, Yotsukaido (JP)

(73) Assignee: Pixtronix, Inc., San Diego, CA (US)

( * ) Notice: Subject to any disclaimer, the term of this patent is extended or adjusted under 35 U.S.C. 154(b) by 835 days.

(21) Appl. No.: 13/465,061

(22) Filed: May 7, 2012

(65) Prior Publication Data

US 2012/0287508 A1 Nov. 15, 2012

(30) Foreign Application Priority Data

May 12, 2011 (JP) .................................. 2011-107118

(51) Int. Cl.
    *G02B 26/02* (2006.01)
    *G02B 3/00* (2006.01)
    *G09F 9/37* (2006.01)

(52) U.S. Cl.
    CPC .............. *G02B 26/02* (2013.01); *G02B 3/0056* (2013.01); *G09F 9/372* (2013.01)

(58) Field of Classification Search
    CPC ........ G02B 26/02; G02B 26/04; G02B 5/005; G01J 3/0232; G01J 3/04; G01J 2003/045; G01J 2003/047; F21V 11/12; F21V 11/14; F21V 11/18; F21V 11/186
    See application file for complete search history.

(56) References Cited

U.S. PATENT DOCUMENTS

| 1,853,778 | A | * | 4/1932 | Rayton | ................ G03B 21/208 359/668 |
|---|---|---|---|---|---|
| 5,062,689 | A | | 11/1991 | Koehler | |
| 5,796,522 | A | * | 8/1998 | Meyers | ......................... 359/626 |
| 6,275,320 | B1 | | 8/2001 | Dhuler et al. | |
| 7,944,599 | B2 | | 5/2011 | Chui et al. | |
| 2001/0000491 | A1 | | 4/2001 | Clark et al. | |
| 2006/0250325 | A1 | | 11/2006 | Hagood et al. | |

(Continued)

FOREIGN PATENT DOCUMENTS

| CN | 101995655 A | 3/2011 |
|---|---|---|
| EP | 1 109 048 | 6/2001 |

(Continued)

OTHER PUBLICATIONS

Taiwan Search Report—TW101115860—TIPO—Feb. 24, 2014.

(Continued)

*Primary Examiner* — Derek S Chapel
(74) *Attorney, Agent, or Firm* — Edward A. Gordon; Foley & Lardner LLP (57) ABSTRACT

Provided is a display device, including: a light shielding film including a plurality of fixed apertures, each allowing passage of light; a lens arranged above the plurality of fixed apertures; a plurality of shutters, which are arranged between the light shielding film and the lens and correspond to the plurality of fixed apertures, respectively, for controlling passage and blocking of the light; and a drive portion for driving each of the plurality of shutters to move between a position above each of the plurality of fixed apertures and a position retracted from each of the plurality of fixed apertures. The plurality of fixed apertures each have an elongated shape including a long-side direction and a short-side direction. The lens has a light refractive power that is larger in the short-side direction than in the long-side direction.

3 Claims, 6 Drawing Sheets

(56) References Cited

U.S. PATENT DOCUMENTS

| | | |
|---|---|---|
| 2009/0141330 A1 | 6/2009 | Namose |
| 2011/0043882 A1 | 2/2011 | Yoon et al. |
| 2011/0079797 A1 | 4/2011 | Sumida et al. |

FOREIGN PATENT DOCUMENTS

| | | |
|---|---|---|
| EP | 1 202 096 | 5/2002 |
| JP | H0251138 A | 2/1990 |
| JP | H05289071 A | 11/1993 |
| JP | H10161044 A | 6/1998 |
| JP | 2002040336 A | 2/2002 |
| JP | 2006251659 A | 9/2006 |
| JP | 2008-197668 | 8/2008 |
| JP | 2009139444 A | 6/2009 |
| JP | 2010039365 A | 2/2010 |
| JP | 2011081916 A | 4/2011 |
| KR | 20110019997 A | 3/2011 |
| TW | 201005513 A | 2/2010 |
| WO | WO 99/10775 | 3/1999 |
| WO | WO 2006/091738 A1 | 8/2006 |
| WO | 2009006120 A1 | 1/2009 |

OTHER PUBLICATIONS

European Search Report—EP12167399—Search Authority—Munich—Aug. 2, 2012.

* cited by examiner

DISPLAY DEVICE

CROSS-REFERENCE TO RELATED APPLICATION

The present application claims priority from Japanese application JP 2011-107118 filed on May 12, 2011, the contents of which are hereby incorporated by reference into this application.

BACKGROUND OF THE INVENTION

1. Field of the Invention

The present invention relates to a display device.

2. Description of the Related Art

A micro-electro-mechanical system (MEMS) display is a display expected to replace a liquid crystal display (see Japanese Patent Application Laid-open No. 2008-197668). This display differs from a liquid crystal shutter type display utilizing polarization, and performs light-dark display by mechanically opening and closing a light transmissive window by a shutter unit including a fixed aperture and a shutter. Specifically, the shutter is arranged above the fixed aperture to block light, and the shutter is retracted from the position above the fixed aperture to allow light passage.

The fixed aperture is defined by an opening formed in a light shielding film, and the shutter is arranged at an interval from the light shielding film to enable driving thereof. Therefore, when the shutter is retracted from the position above the fixed aperture, light traveling perpendicularly to a screen passes through the fixed aperture, but light traveling obliquely in a direction of the retracted shutter is blocked by the shutter. Therefore, there has been a problem in viewing angle characteristics that brightness differs depending on viewing directions.

SUMMARY OF THE INVENTION

The present invention has an object to solve the problem in viewing angle characteristics.

(1) According to an exemplary embodiment of the present invention, there is provided a display device, including: a light shielding film including a plurality of fixed apertures, each allowing passage of light; a lens arranged above the plurality of fixed apertures; a plurality of shutters, which are arranged between the light shielding film and the lens and correspond to the plurality of fixed apertures, respectively, for controlling passage and blocking of the light; and a drive portion for driving each of the plurality of shutters to move between a position above each of the plurality of fixed apertures and a position retracted from each of the plurality of fixed apertures (that is, between a position for allowing the light to pass and a position for blocking the light). The plurality of fixed apertures each have an elongated shape including a long-side direction and a short-side direction. The lens has a light refractive power that is larger in the short-side direction than in the long-side direction. According to the present invention, light is refracted in the short-side direction to disperse the light in this direction, and hence it is possible to solve the problem in viewing angle characteristics.

(2) In the display device according to Item (1), the lens may be a concave lens, and may have a curvature that is larger in the short-side direction than in the long-side direction.

(3) In the display device according to Item (1), the lens may be a plano-concave cylindrical lens.

(4) In the display device according to Item (3), the plurality of fixed apertures may be arrayed in a plurality of columns, and the plano-concave cylindrical lens may be arranged with respect to at least two of the plurality of fixed apertures, which are arrayed in at least one column of the plurality of columns.

DETAILED DESCRIPTION OF THE INVENTION

Figure 1:
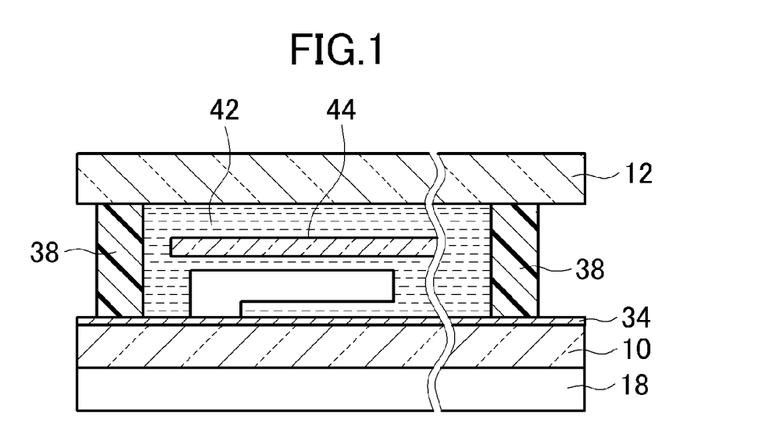
FIG. 1 is a sectional view schematically illustrating a display device according to an embodiment of the present invention.
Figure 2:
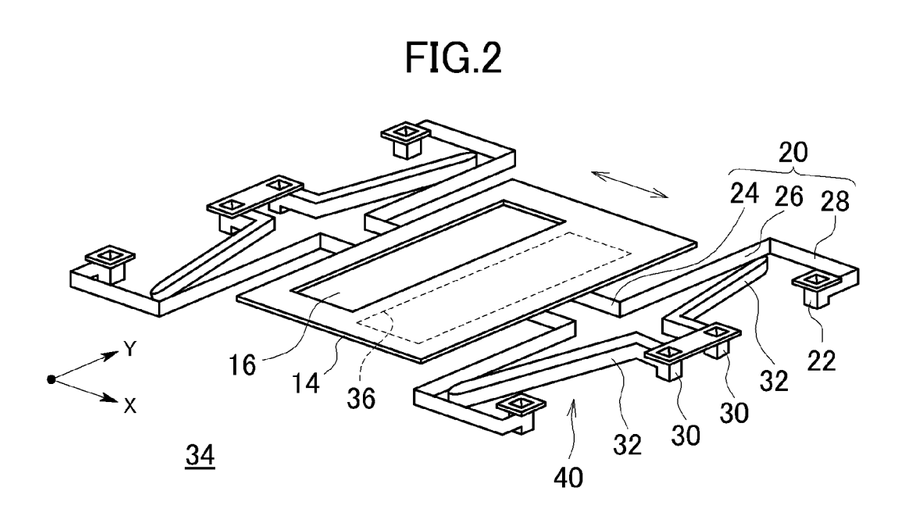
FIG. 2 is a view illustrating a shutter and a drive portion thereof.

Hereinafter, an embodiment of the present invention is described with reference to the drawings. FIG. 1 is a sectional view schematically illustrating a display device according to the embodiment of the present invention. FIG. 2 is an enlarged perspective view of a part of an inner structure of the display device.

The display device includes a pair of light transmissive substrates 10 and 12 (for example, glass substrates). The pair of light transmissive substrates 10 and 12 are arranged so as to be opposed to each other at an interval. One light transmissive substrate 10 has a light shielding film 34 formed thereon on a side opposed to the other light transmissive substrate 12. In the light shielding film 34, as illustrated in FIG. 2, a plurality of fixed apertures 36, each allowing passage of light, are formed. The plurality of fixed apertures 36 each have an elongated shape including a long-side direction Y and a short-side direction X.

As illustrated in FIG. 2, a plurality of shutters 14 are arranged at an interval from the light shielding film 34. The shutter 14 corresponds to the fixed aperture 36 and controls passage and blocking of light. Light is blocked when the shutter 14 covers the fixed aperture 36, and light is allowed to pass when the shutter 14 is positioned so as to avoid a position above the fixed aperture 36. In a case of the shutter 14 including a drive aperture 16, light is allowed to pass when the drive aperture 16 matches with the fixed aperture 36 (the drive aperture 16 is arranged above the fixed aperture 36). In the example of FIG. 2, one fixed aperture 36 corresponds to one drive aperture 16. Alternatively, in a case of a shutter 14 (not shown) without a drive aperture, light is allowed to pass when the shutter 14 is retracted from the position above the fixed aperture 36.

The shutter 14 is provided on the one light transmissive substrate 10. FIG. 2 is a view illustrating the shutter 14 and a drive portion 40 thereof. The shutter 14 is a plate including the drive aperture 16. Light is allowed to pass through the drive aperture 16, and is blocked at a part other than the drive aperture 16. The drive aperture 16 has a shape long in one direction. Note that, as illustrated in FIG. 1, light is supplied from a backlight unit 18 lying under the light transmissive substrate 10.

The shutter 14 is supported by a first spring 20 to be suspended above the light transmissive substrate 10. A plurality of (four in FIG. 2) first springs 20 support the shutter 14. The first spring 20 is fixed to the light transmissive substrate 10 by a first anchor portion 22.

The first spring 20 is made of an elastically deformable material, and is arranged so as to be deformable in a direction parallel to the plate surface of the shutter 14. Specifically, the first spring 20 includes a first portion 24 extending in a direction separating from the shutter 14 (direction intersecting (for example, orthogonal to) the length direction of the drive aperture 16), a second portion 26 extending in a direction along the length direction of the drive aperture 16 outwardly from a center of the drive aperture 16 in the length direction, and a third portion 28 further extending in the direction separating from the shutter 14 (direction intersecting (for example, orthogonal to) the length direction of the drive aperture 16). Further, as indicated by the arrows in FIG. 2, the shutter 14 is movable in the direction intersecting (for example, orthogonal to) the length direction of the drive aperture 16.

The light transmissive substrate 10 is provided with a second spring 32 supported by a second anchor portion 30. The second spring 32 is opposed to the second portion 26 of the first spring 20 on a side separated from the shutter 14 with respect to the second portion 26. When a voltage is applied to the second anchor portion 30, due to the electrostatic attractive force caused by the potential difference between the second anchor portion 30 and the second portion 26 of the first spring 20, the second portion 26 is attracted toward the second anchor portion 30. When the second portion 26 is attracted, the shutter 14 is also attracted via the first portion 24 provided integrally with the second portion 26. That is, the first spring 20 and the second spring 32 are provided for constituting the drive portion 40 for mechanically driving the shutter 14.

Light is allowed to pass when the above-mentioned drive aperture 16 of the shutter 14 and the fixed aperture 36 of the light shielding film 34 communicate with each other, and light is blocked when the fixed aperture 36 of the light shielding film 34 is covered due to the movement of the shutter 14. In other words, the shutter 14 is mechanically driven so as to control the passage and blocking of light through the fixed aperture 36 of the light shielding film 34. One drive aperture 16 and one fixed aperture 36 corresponding to each other constitute one pixel, and an image is displayed by a large number of pixels. Therefore, a plurality of (large number of) shutters 14 are provided.

Figure 3:
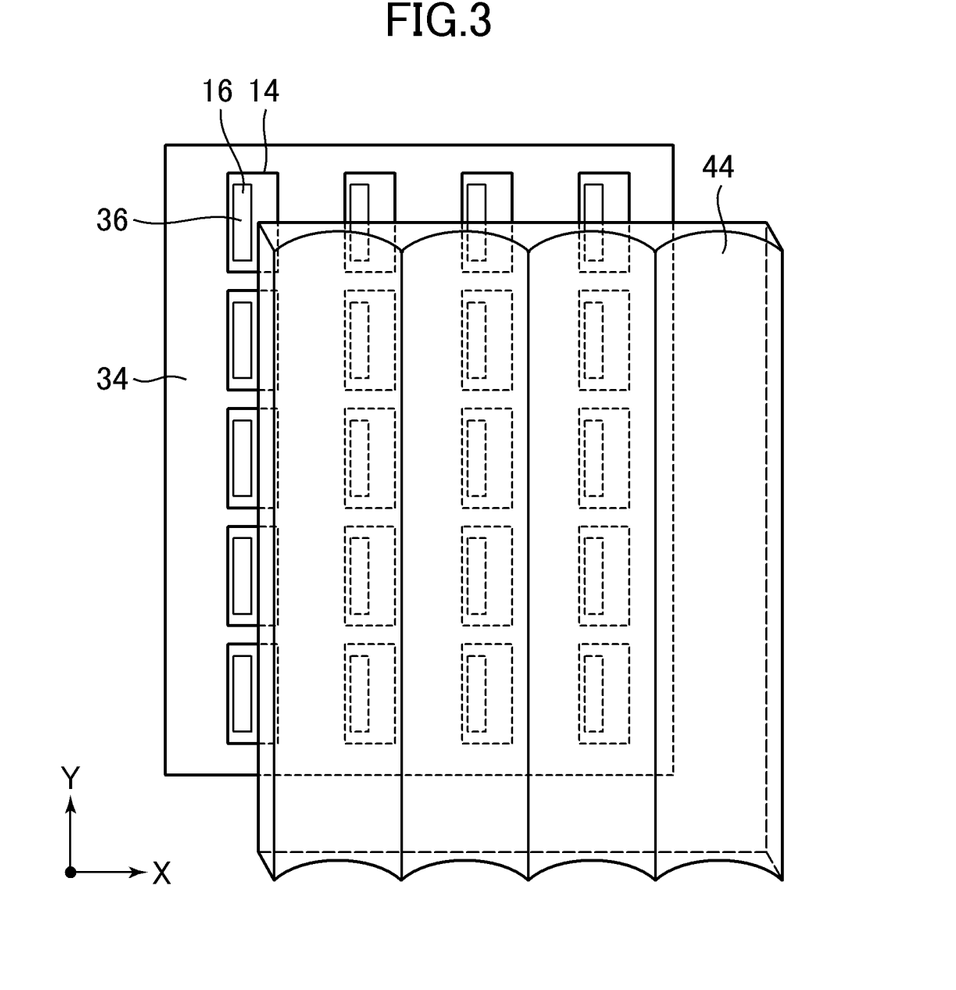
FIG. 3 is a view illustrating an arrangement of the shutter and a lens.
Figure 4:
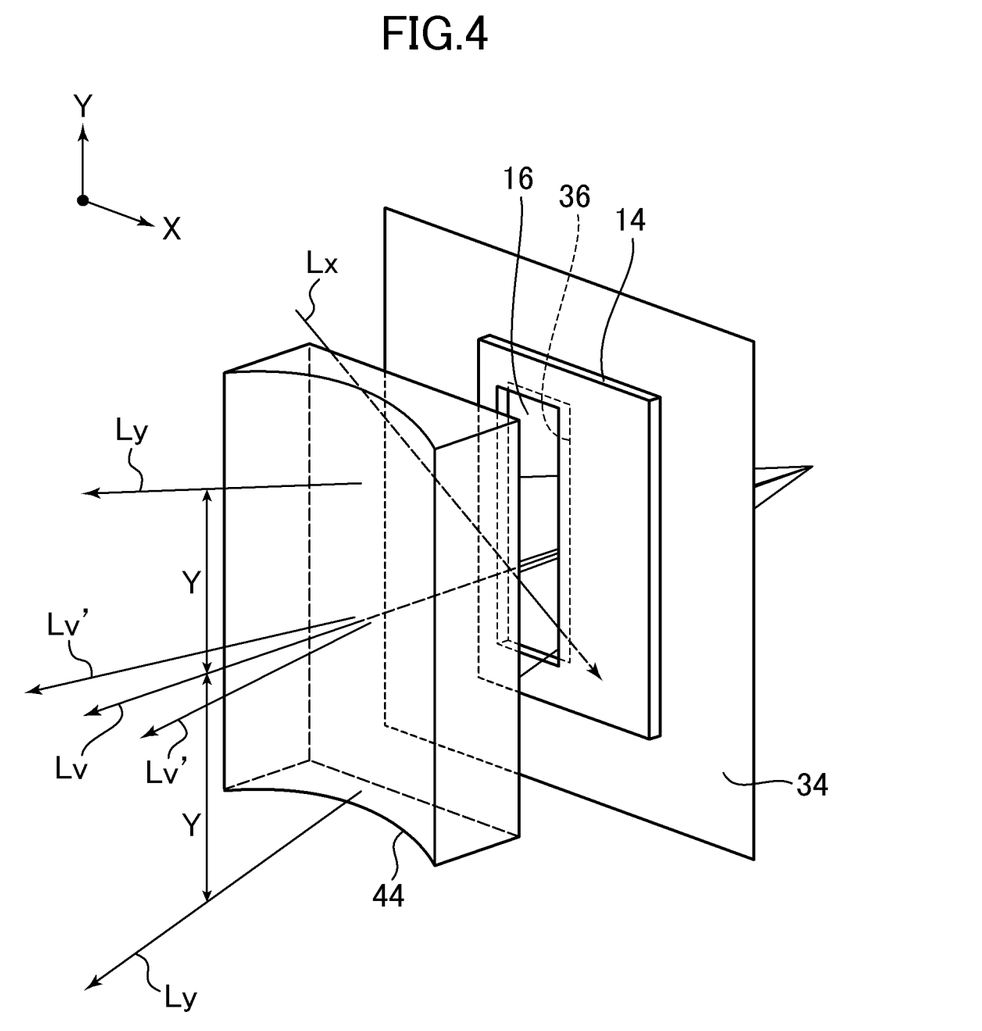
FIG. 4 is a view illustrating the action and effect of the lens.

As illustrated in FIG. 1, a lens 44 is arranged above the shutter (above each of the fixed apertures 36). FIG. 3 is a view illustrating an arrangement of the shutter 14 and the lens 44. FIG. 4 is a view illustrating the action and effect of the lens 44.

The lens 44 is used to diffuse light, and is, for example, a concave lens. As illustrated in FIG. 3, a plurality of fixed apertures 36 are arrayed in a plurality of columns, and one plano-concave cylindrical lens is arranged with respect to at least two fixed apertures 36 arranged in at least one column. Parts of the one plano-concave cylindrical lens corresponding to the individual fixed apertures 36 are the individual lenses 44. The individual lenses 44 are each a plano-concave cylindrical lens. Further, a plurality of plano-concave cylindrical lenses are integrally arrayed to form a lens array.

The lens 44 has a different light refractive power depending on the entering direction of the light. The plano-concave cylindrical lens is an example which exerts this effect. As illustrated in FIG. 4, the lens 44 is arranged so that a curvature thereof in the short-side direction X of the fixed aperture 36 is larger than a curvature thereof in the long-side direction Y. In the plano-concave cylindrical lens, a curvature in the long-side direction Y is zero (straight line). Therefore, the lens 44 has a light refractive power that is larger in the short-side direction X of the fixed aperture 36 than in the long-side direction Y thereof.

Next, the action and effect of the display device according to this embodiment are described with reference to FIG. 4. In this embodiment, the drive portion 40 (see FIG. 2) enables each of the plurality of shutters 14 to move between a position above the fixed aperture 36 and a position retracted from the fixed aperture 36.

Light passing through the fixed aperture 36 includes light $L_v$ traveling perpendicularly to the fixed aperture 36 (to the surface of the light shielding film 34), and light traveling obliquely to the fixed aperture 36 (to the surface of the light shielding film 34). The light traveling obliquely includes light $L_y$ inclined in the long-side direction Y (along a plane extending in the long-side direction Y), and light $L_x$ inclined in the short-side direction X (along a plane extending in the short-side direction X).

Because the fixed aperture 36 and the drive aperture 16 communicate with each other, the light $L_v$ passing through the fixed aperture 36 perpendicularly (in a direction orthogonal to the surface of the light shielding film 34) further passes through the drive aperture 16. Further, the light $L_y$ inclined in the long-side direction Y of the fixed aperture 36 is inclined in the long-side direction Y of the drive aperture 16, and hence the light $L_y$ passes through the drive aperture 16 from the fixed aperture 36. Further, light $L_v'$, which is inclined in the short-side direction X but the inclination angle is small, travels without being blocked by the shutter 14. The maximum angle formed between an optical axis of the light $L_v'$, which inclines in the short-side direction X but travels without being blocked by the shutter 14, and an optical axis of the light $L_v$ traveling perpendicularly is represented by α.

In contrast, the light $L_x$, which inclines in the short-side direction X at an angle exceeding α, passes through the fixed aperture 36, but travels in the short-side direction X of the drive aperture 16, and hence the traveling thereof is blocked by the shutter 14. Therefore, the pixel controlled by the shutter 14 looks bright when obliquely viewed in the long-side direction Y and dark when obliquely viewed in the short-side direction X.

However, according to this embodiment, the above-mentioned lens 44 is arranged, thereby increasing the light refracting angle along the short-side direction X, and expanding the light in the short-side direction X. That is, the optical axis of the light $L_v'$, which inclines in the short-side direction X but travels without being blocked by the shutter 14, and the optical axis of the light $L_v$ traveling perpendicularly form an angle that is within α when the light enters the lens 44 but exceeds α through refraction when the light exits from the lens 44. Therefore, the light can be dispersed in the short-side direction X. With this, it is possible to solve the problem in viewing angle characteristics.

Figure 5:
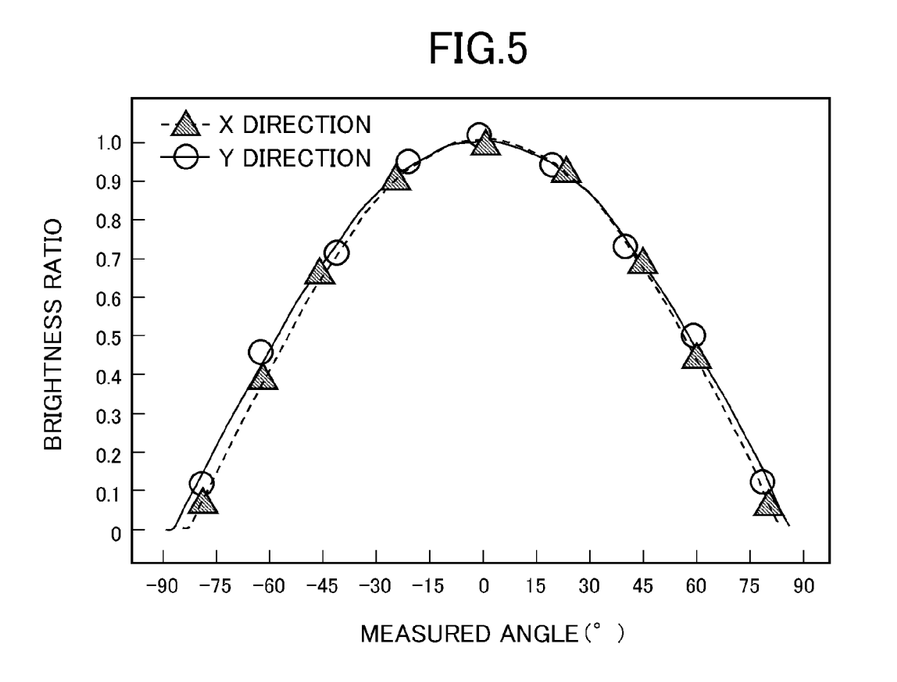
FIG. 5 is a graph showing brightness characteristics of the display device according to the embodiment of the present invention.

FIG. 5 is a graph showing brightness characteristics of the display device according to this embodiment. The horizontal axis represents the measured angle of the long-side direction Y or the short-side direction X, and the vertical axis represents the brightness ratio on the condition that the brightness when the measured axis is 0° (perpendicular) is set to 1.0. It can be understood from the graph that there is no great difference in brightness ratio between the long-side direction Y and the short-side direction X.

As illustrated in FIG. 1, the pair of light transmissive substrates 10 and 12 are fixed at an interval with a sealing member 38. The sealing member 38 is provided in close contact with the pair of light transmissive substrates 10 and 12. Further, the sealing member 38 defines an encapsulation space between the pair of light transmissive substrates 10 and 12.

As illustrated in FIG. 1, oil 42 (for example, silicone oil 42) is filled in the encapsulation space. The shutter 14 and the drive portion 40 are arranged in the oil 42. The oil 42 can suppress vibrations caused by the movement of the shutter 14 and the drive portion 40. Further, through the filling of the oil 42, the dielectric constant increases, and the voltage for driving with the electrostatic attractive force can be reduced.

Figure 6:
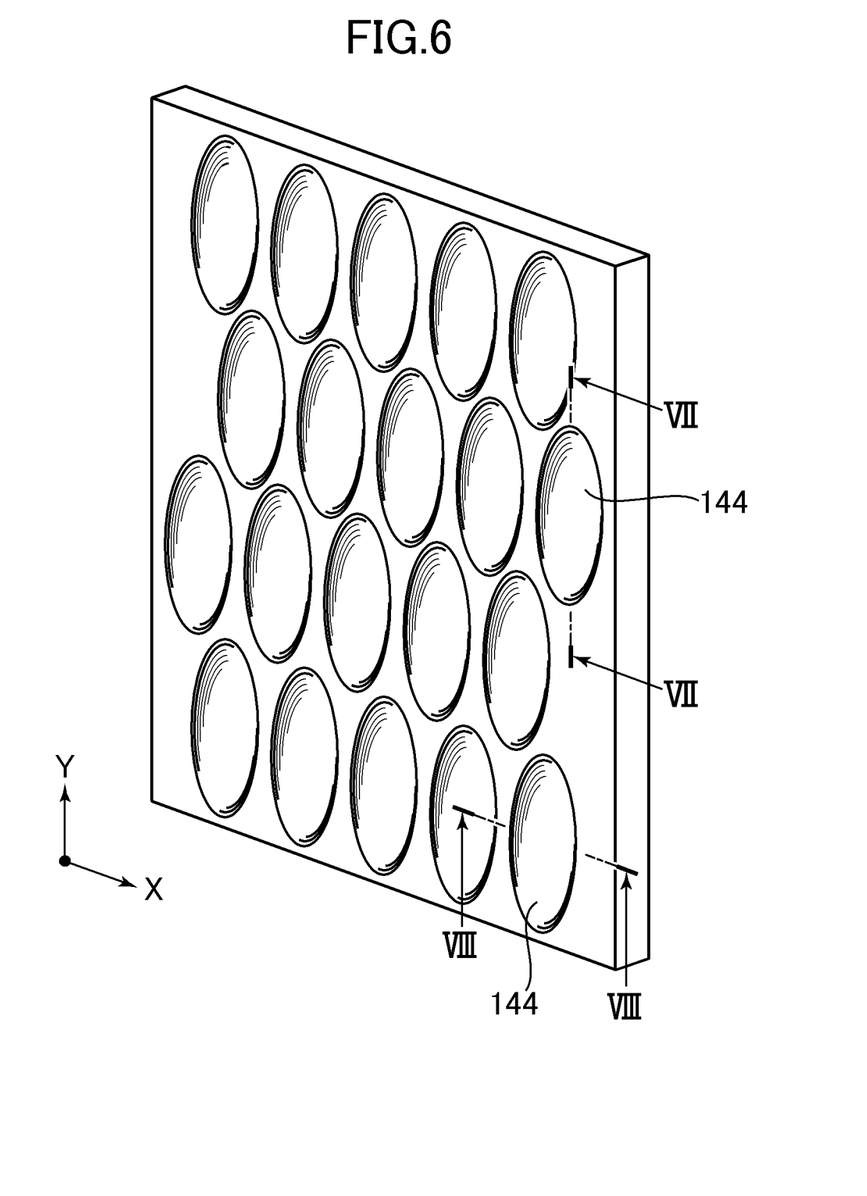
FIG. 6 is a view illustrating a modified example of the lens of the display device according to the embodiment of the present invention.
Figure 7:
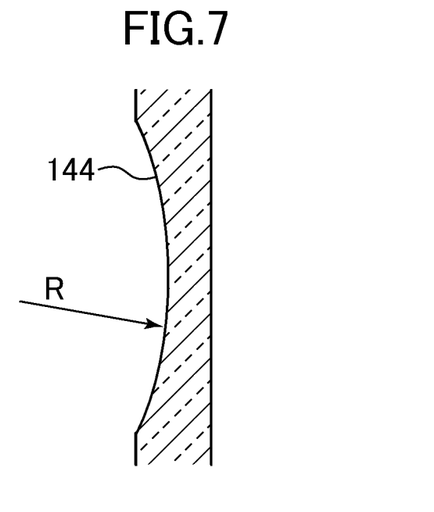
FIG. 7 is a sectional view taken along the line VII-VII of the lens illustrated in FIG. 6.
Figure 8:
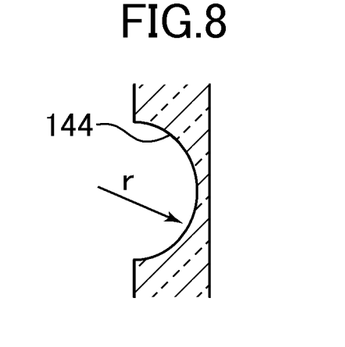
FIG. 8 is a sectional view taken along the line VIII-VIII of the lens illustrated in FIG. 6.

FIG. 6 is a view illustrating a modified example of the lens of the display device according to the embodiment. FIG. 7 is a sectional view taken along the line VII-VII of the lens illustrated in FIG. 6. FIG. 8 is a sectional view taken along the line VIII-VIII of the lens illustrated in FIG. 6.

In this example, a lens 144 is an elliptical concave lens. A curvature radius R (see FIG. 7) of the lens 144 in the long-side direction Y is larger than a curvature radius r (see FIG. 8) thereof in the short-side direction X. In other words, the lens 144 has a curvature that is larger in the short-side direction X than in the long-side direction Y. FIG. 6 illustrates a lens array in which a plurality of lenses 144 are integrated. Each of the lenses 144 may correspond to the individual fixed aperture, or each of the lenses 144 may correspond to at least two of the fixed apertures. The lens 144 may be used instead of the above-mentioned lens 44.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
   a light shielding film including a plurality of fixed apertures, each allowing passage of light;
   a lens arranged above the plurality of fixed apertures;
   a plurality of shutters, which are arranged between the light shielding film and the lens and correspond to the plurality of fixed apertures, respectively, for controlling passage and blocking of the light; and
   a drive portion for causing each of the plurality of shutters to move between a position for allowing the light to pass and a position for blocking the light,
   wherein the plurality of fixed apertures each have an elongated shape including a long-side direction and a short-side direction,
   wherein the lens has a light refractive power that is larger in the short-side direction than in the long-side direction,
   wherein the lens includes an elliptical concave lens, and
   wherein the curvature radius R of the elliptical concave lens in the long-side direction is larger than a curvature radius r thereof in the short-side direction.

2. The display device of claim 1, wherein the lens includes a plurality of elliptical concave lenses, each having dimensions similar to the elliptical concave lens, arranged above the plurality of fixed apertures such that each of the plurality of concave lenses corresponds to one of the plurality of fixed apertures.

3. The display device of claim 1, wherein the plurality of fixed apertures are arranged along an axis that is parallel to a long-side direction of each of the plurality of fixed apertures, and wherein the elliptical concave lens corresponds to at least two of the plurality of fixed apertures.

* * * * *